United States Patent
Matsumura et al.

(10) Patent No.: US 10,753,484 B2
(45) Date of Patent: Aug. 25, 2020

(54) PIN-FASTENING STRUCTURE FOR VALVE SHAFT AND VALVE BODY

(71) Applicant: AZBIL CORPORATION, Chiyoda-ku (JP)

(72) Inventors: Takahiro Matsumura, Chiyoda-ku (JP); Yoshio Nomaguchi, Chiyoda-ku (JP); Tomonori Shintani, Chiyoda-ku (JP)

(73) Assignee: AZBIL CORPORATION, Chiyoda-ku (JP)

( * ) Notice: Subject to any disclaimer, the term of this patent is extended or adjusted under 35 U.S.C. 154(b) by 0 days.

(21) Appl. No.: 16/202,435

(22) Filed: Nov. 28, 2018

(65) Prior Publication Data

US 2019/0162315 A1 May 30, 2019

(30) Foreign Application Priority Data

Nov. 28, 2017 (JP) ................. 2017-227432

(51) Int. Cl.
| | |
|---|---|
| *F16K 5/06* | (2006.01) |
| *F16K 1/48* | (2006.01) |
| *F16B 1/00* | (2006.01) |

(52) U.S. Cl.
CPC .............. *F16K 5/0647* (2013.01); *F16B 1/00* (2013.01); *F16K 5/0642* (2013.01); *F16K 1/487* (2013.01)

(58) Field of Classification Search
CPC .... F16K 5/0647; F16K 5/0624; F16K 31/528; F16K 1/487; F16K 1/482; F16K 1/48;

(Continued)

(56) References Cited

U.S. PATENT DOCUMENTS

| | | | | |
|---|---|---|---|---|
| 3,078,065 A | * | 2/1963 | Vickery | ................. F16K 5/208 251/58 |
| 3,305,208 A | * | 2/1967 | Bredtschneider | ....... F16K 3/314 251/88 |

(Continued)

FOREIGN PATENT DOCUMENTS

| | | |
|---|---|---|
| JP | 3-29643 | 6/1991 |
| JP | 3522502 B2 | 4/2004 |

(Continued)

OTHER PUBLICATIONS

Combined Office Action and Search Report dated Dec. 2, 2019 in Chinese Patent Application No. 201811433503.2, 16 pages (with English translation).

*Primary Examiner* — Kelsey E Cary

(74) *Attorney, Agent, or Firm* — Oblon, McClelland, Maier & Neustadt, L.L.P.

(57) ABSTRACT

A pin-fastening structure includes a first shaft portion provided in a valve shaft; a cylindrical portion into which the first shaft portion is fitted, the cylindrical portion being provided in a valve body; and a connecting pin that passes through both the first shaft portion and the cylindrical portion in a state in which the first shaft portion is fitted into the cylindrical portion and that restricts relative movement of the first shaft portion and the cylindrical portion in an axial direction. The first shaft portion has a first end surface perpendicular to the axis of the valve shaft. The cylindrical portion has second end surfaces perpendicular to the axis of the valve body. The first shaft portion and the cylindrical portion are fastened by the connecting pin in a state in which the first end surface and the second end surfaces are in contact with each other.

6 Claims, 6 Drawing Sheets

(58) Field of Classification Search
CPC ... F16K 1/222; F16K 5/06; F16K 5/08; F16B 21/12
See application file for complete search history.

(56) References Cited

U.S. PATENT DOCUMENTS

| | | | | |
|---|---|---|---|---|
| 3,767,162 | A * | 10/1973 | Olsson | F16K 5/0647 251/84 |
| 4,822,000 | A * | 4/1989 | Bramblet | F16K 5/0647 251/180 |
| 2004/0104374 | A1* | 6/2004 | Lovell | F16K 1/48 251/357 |
| 2010/0148106 | A1* | 6/2010 | Whitefield | F16K 1/222 251/305 |
| 2011/0214288 | A1* | 9/2011 | Dalluge | F16K 1/221 29/890.124 |
| 2015/0345251 | A1* | 12/2015 | Nicholson | E21B 34/02 166/91.1 |
| 2016/0223088 | A1* | 8/2016 | Richardson | F16K 1/32 |
| 2016/0238154 | A1* | 8/2016 | Alman | F16B 39/025 |
| 2018/0107094 | A1* | 4/2018 | Yowler | F16B 21/12 |

FOREIGN PATENT DOCUMENTS

| | | | |
|---|---|---|---|
| JP | 5810335 | B2 | 11/2015 |
| JP | 5925592 | B2 | 5/2016 |

* cited by examiner

PIN-FASTENING STRUCTURE FOR VALVE SHAFT AND VALVE BODY

CROSS-REFERENCE TO RELATED APPLICATIONS

The present application is based on and claims priority to Japanese Application No. 2017-227432, filed Nov. 28, 2017, the entire contents of which are incorporated herein by reference.

BACKGROUND

1. Field

The present disclosure relates to a pin-fastening structure for a valve shaft and a valve body, the structure fastening the valve shaft and the valve body by using a shaft portion, a cylindrical portion, and a connecting pin.

2. Description of the Related Art

Typically, a valve used in a flow-rate controller includes a valve body that opens and closes a fluid passage and a valve shaft that is driven by an operation device. It is desirable in a valve of such a type that the axis of a valve body and the axis of a valve shaft be positioned coaxially with each other. Thus, a pin-fastening structure that includes a fitting portion and a connecting pin generally used to fasten a valve body and a valve shaft. Typical pin-fastening structures of such a type are disclosed in, for example, Japanese Patent No. 5810335 (hereinafter referred to as Patent Document 1), Japanese Examined Utility Model Registration Application Publication No. 3-29643 (hereinafter referred to as Patent Document 2), and Japanese Patent No. 3522502 (hereinafter referred to as Patent Document 3).

Patent Document 1 discloses a pin-fastening structure that connects a valve body and a valve shaft of a ball valve to each other. The pin-fastening structure includes a cylindrical portion extending from a valve body, a distal end portion of the valve shaft fitted into the cylindrical portion, and a connecting pin that transverses these portions.

Patent Document 2 discloses a pin-fastening structure that fastens a valve body and a valve shaft of a butterfly valve. The pin-fastening structure includes a connecting pin that passes through the valve body together with the valve shaft inserted into the valve body.

Patent Document 3 discloses a pin-fastening structure that connects a reciprocating valve body and a valve shaft to each other. The pin-fastening structure includes a connecting pin that transverses a fitting portion between the valve body and the valve shaft and a cylindrical cover into which the fitting portion is fitted.

If coaxiality between the axis of a valve body and the axis of a valve shaft is low in a valve such as a ball valve or a butterfly valve having a structure in which a valve body rotates, the valve body rotates eccentrically when the valve shaft is driven to rotate by an operation device. Such eccentric rotation of a valve body may increase rotational resistance of the valve body and thus increase operational force (torque) of an operation device or may cause a valve body to separate from a valve seat and thus cause a leak in the valve seat.

If coaxiality between a valve shaft and a valve body is low in a valve that includes a reciprocating valve body, when the valve body comes into contact with a valve seat, a gap is formed therebetween, and consequently, a leak occurs in the valve seat.

SUMMARY

When the pin-fastening structure disclosed in Patent Document 1 or Patent Document 2 is employed to increase coaxiality between a valve shaft and a valve body, in other words, when a valve shaft is inserted into a shaft hole of a valve body and the valve shaft and the valve body are connected to each other by a connecting pin, inclining of the valve shaft or the valve body is preferably minimized. To achieve this, preferably, a gap of a fitting portion between the valve shaft and the shaft hole is narrowed and a fitting length is lengthened.

Narrowing a gap of a fitting portion between a valve shaft and a shaft hole, however, decreases ease of assembly and is thus limited. Moreover, a lengthened fitting length increases the size of a valve body, which may cause other inconveniences. For example, in a ball valve having a side entry structure in which a valve body is inserted into a valve box from a side surface (pipe connection portion) of the valve box, a valve shaft is inserted further into the valve body, and an opening of the valve body is thus decreased. As a result, an issue in which a maximum Cv value decreases occurs. Coaxiality between a valve shaft and a valve body and a maximum Cv value have a trade-off relationship in a side entry structure of such a type.

In addition, in a top entry structure in which a valve body is inserted into a valve box from an upper portion of the valve box or in a bottom entry structure in which a valve body is inserted into a valve box from a bottom portion of the valve box, an increase in the size of the valve body increases the size of an upper cover and a lower cover, which causes an issue in which both the volume and the weight of the structure is increased compared with a side entry structure.

Moreover, when a cover for covering a valve shaft and a valve body is used, as described in Patent Document 3, to increase coaxiality between the valve shaft and the valve body, the external form is increased by the size of the cover, and the number of components is also increased, resulting in cost increases.

Accordingly, it is an object of the present disclosure to provide a pin-fastening structure for a valve shaft and a valve body, capable of fastening a valve shaft and a valve body to each other with high coaxiality by using a connecting pin without depending on the length of a fitting portion between the valve shaft and valve body.

To achieve the purpose, a pin-fastening structure for a valve shaft and a valve body according to an embodiment of the present disclosure includes a shaft portion provided in either one of a valve body that pivots or reciprocates inside a valve box and a valve shaft that pivots or reciprocates in conjunction with the valve body, the shaft portion being positioned coaxially with an axis that serves as a reference for pivoting or reciprocating; a cylindrical portion into which the shaft portion is fitted, the cylindrical portion being provided in, of the valve body and the valve shaft, another one in which the shaft portion is not provided; and a connecting pin that passes through both the shaft portion and the cylindrical portion in a state in which the shaft portion is fitted into the cylindrical portion and that restricts relative movement of the shaft portion and the cylindrical portion in an axial direction, in which the shaft portion has a first end surface perpendicular to the axis, in which the cylindrical portion has a second end surface perpendicular to an axis of the cylindrical portion, and in which the shaft portion and the cylindrical portion are fastened to each other by the connecting pin in a state in which the first end surface and the second end surface are in contact with each other.

In the pin-fastening structure for the valve and the valve body according to the embodiment of the present disclosure, the second end surface may be disposed, at one end of the cylindrical portion in the axial direction, on each of two sides of the connecting pin when the cylindrical portion is viewed in the axial direction, and a recessed portion may be disposed, at the one end of the cylindrical portion in the axial direction, in a predetermined area that includes a portion overlapping the connecting pin when the cylindrical portion is viewed in the axial direction.

In the pin-fastening structure for the valve shaft and the valve body according to the embodiment of the present disclosure, the connecting pin may be a tapered pin that is press-fitted into the shaft portion and the cylindrical portion and, in a state in which the valve body is positioned at a closing position to close a fluid passage, a relatively thin one end portion of the connecting pin may be positioned on an upstream side of the fluid passage and a relatively thick other end portion of the connecting pin may be positioned on a downstream side of the fluid passage.

In the embodiment of the present disclosure, as a result of the first end surface and the second end surface coming into contact with each other, the axis of the shaft portion and the axis of the cylindrical portion becomes parallel to each other. Consequently, it is possible without depending on the length of a fitting portion between the valve shaft and the valve body to avoid inclining of the valve shaft relative to the valve body. Therefore, according to the embodiment of the present disclosure, it is possible to provide a pin-fastening structure for a valve shaft and a valve body, capable of fastening a valve shaft and valve body to each other with high coaxiality by using a connecting pin while reducing the length of a fitting portion between the valve shaft and the valve body.

DETAILED DESCRIPTION

First Embodiment

Hereinafter, an embodiment of a pin-fastening structure for a valve shaft and a valve body according the present disclosure will be described in detail with reference to FIGS. 1 to 10. In the present embodiment, an example in which the present disclosure is applied to a rotary valve is presented.

Figure 1:
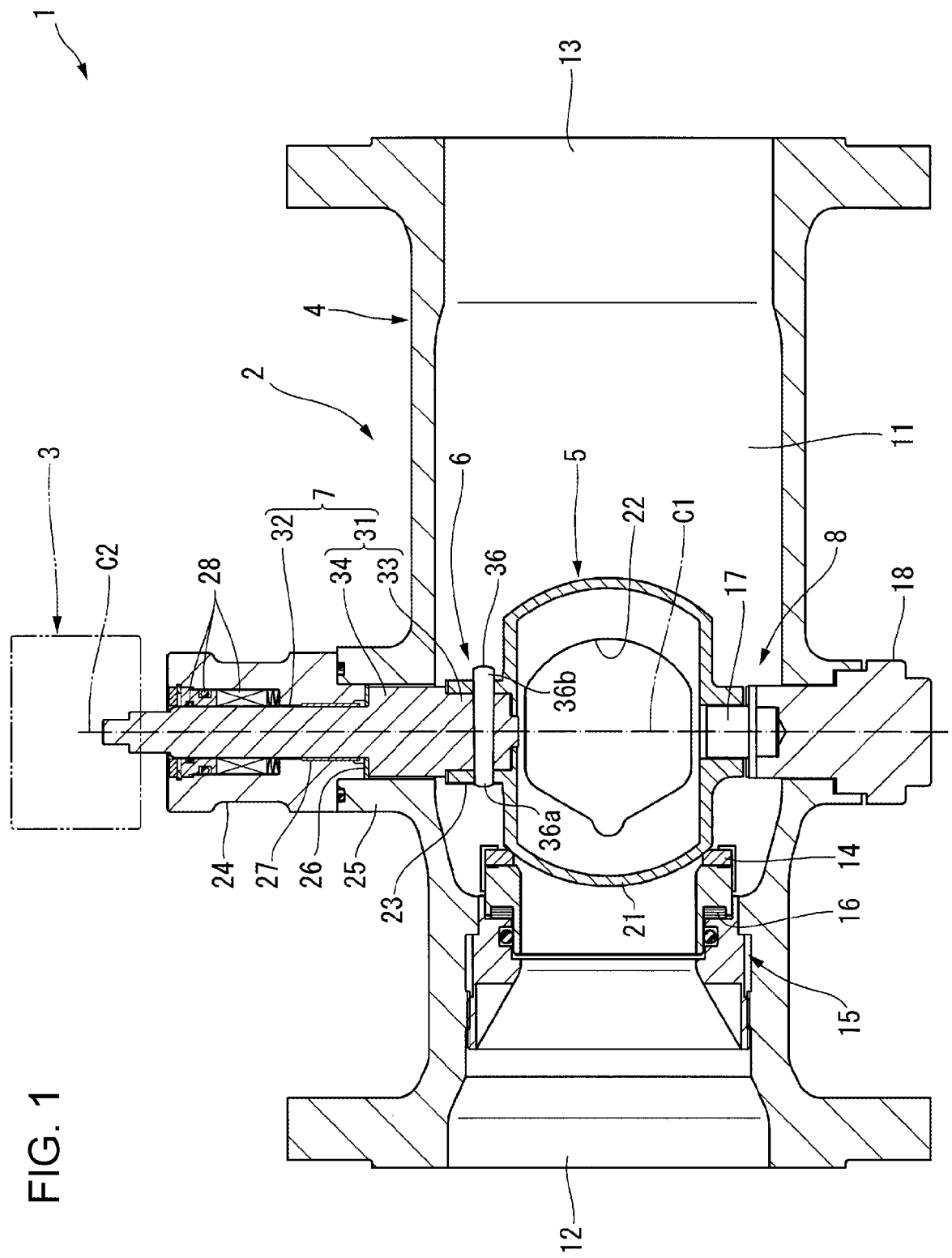
FIG. 1 is a sectional view of a rotary valve to be used in a pin-fastening structure for a valve shaft and a valve body according to an embodiment of the present disclosure.

FIG. 1 illustrates a flow-rate controller 1 that includes a rotary valve 2 and an operation device 3 that drives the rotary valve 2.

The rotary valve 2 includes a valve body 5 housed in a valve box 4, a valve shaft 7 connected to the valve body 5 via a pin-fastening structure 6 (described later), and a support structure 8 that supports the valve body 5 in cooperation with the valve shaft 7.

The valve box 4 has a tube shape and includes a fluid passage 11 in an inner portion thereof. The valve body 5 is used to open and close the fluid passage 11. The valve box 4 has one end portion (end portion on the left side in FIG. 1) provided with an opening as a fluid inlet 12 and the other end portion provided with an opening as a fluid outlet 13. A seat ring holding mechanism 15 that includes a seat ring 14 at a downstream-side end portion thereof is provided between the valve body 5 and the fluid inlet 12 inside the valve box 4. The seat ring 14 has an annular shape and is urged against the valve body 5 due to the spring force of a spring member 16 provided in the seat ring holding mechanism 15.

The valve body 5 is pivotably supported by the valve box 4. The valve body 5 includes a wall 21 that closes the fluid passage 11 inside the valve box 4 in a state in which the valve body 5 is positioned at a closing position illustrated in FIG. 1 and a hole 22 that serves as a portion of the fluid passage 11 in a state in which the valve body 5 is positioned at an opening position. The valve body 5 pivots about an axis C1 extending in a direction orthogonal to a direction of fluid flow (direction from left to right in FIG. 1).

In a direction in which the axis C1 extends, a cylindrical portion 23 constituting a portion of the pin-fastening structure 6 (described later) is disposed at one end portion (end portion on the upper side in FIG. 1) of the valve body 5 so as to be integral therewith. The one end portion of the valve body 5 is pivotably supported by the valve box 4 via the pin-fastening structure 6, the valve shaft 7, and a support member 24 through which the valve shaft 7 passes.

The other end portion (end portion on the lower side in FIG. 1) of the valve body 5 is pivotably supported by the valve box 4 via the support structure 8. The support structure 8 includes a support shaft 17 that is positioned coaxially with the axis C1 of the valve body 5 and a plug 18 that is fixed to the valve box 4 and supports the support shaft 17. The support shaft 17 is rotatably fitted into the other end portion of the valve body 5.

The support member 24 has a cylindrical shape and is fixed to a valve-shaft boss portion 25 of the valve box 4 by a fixing member (not illustrated). A first bearing member 26 that has an annular disc shape and that is to be subjected to a load in the axial direction of the valve shaft 7 and a second bearing member 27 that has a cylindrical shape and that is to be subjected to a load in a direction orthogonal to the axial direction are provided between the valve shaft 7 and one end portion of the support member 24 fixed to the valve box 4.

The other end portion of the support member 24 is provided with a plurality of seal members 28 that seal gaps between the support member 24 and the valve shaft 7.

Figure 2:
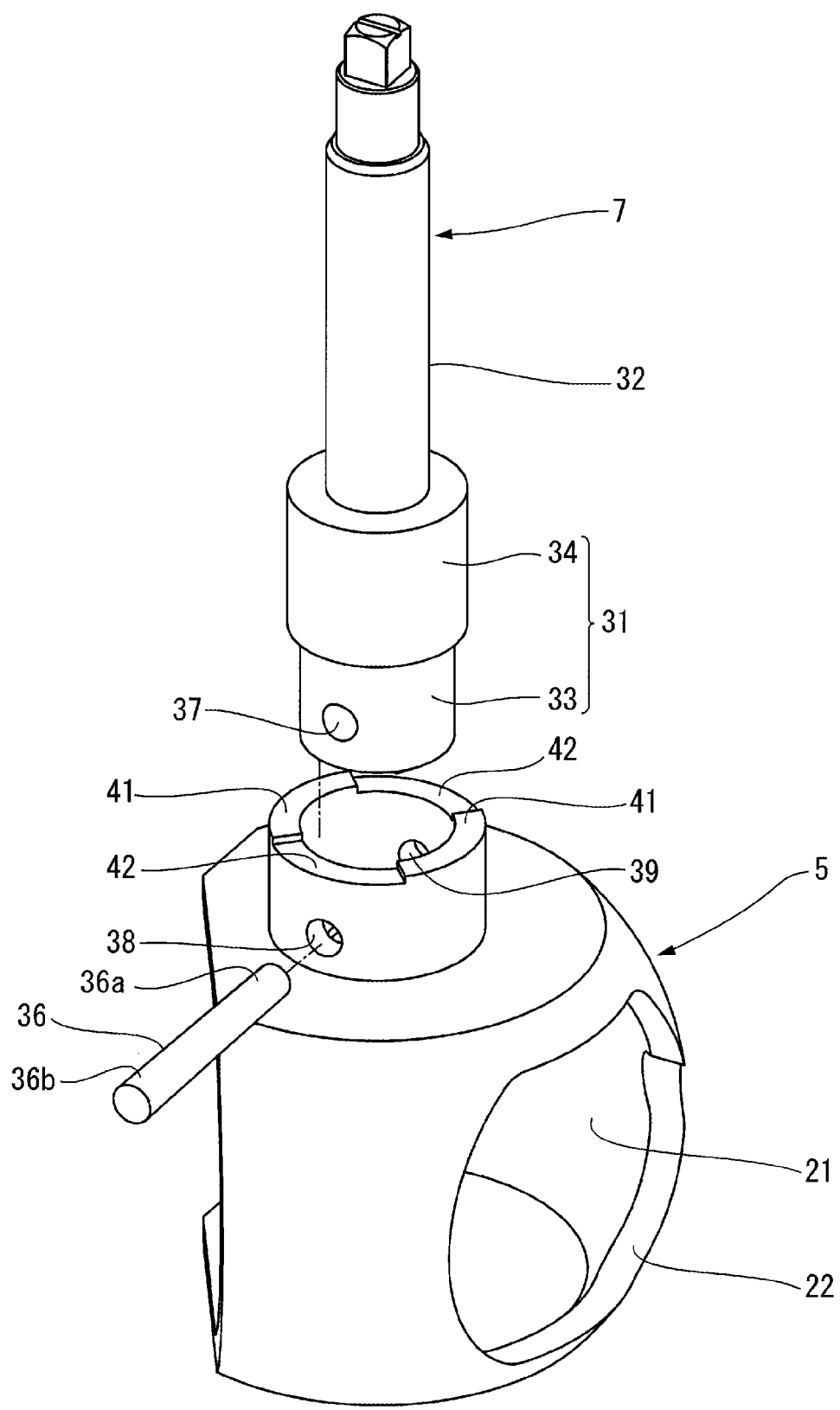
FIG. 2 is a perspective view of the valve body and the valve shaft.
Figure 3:
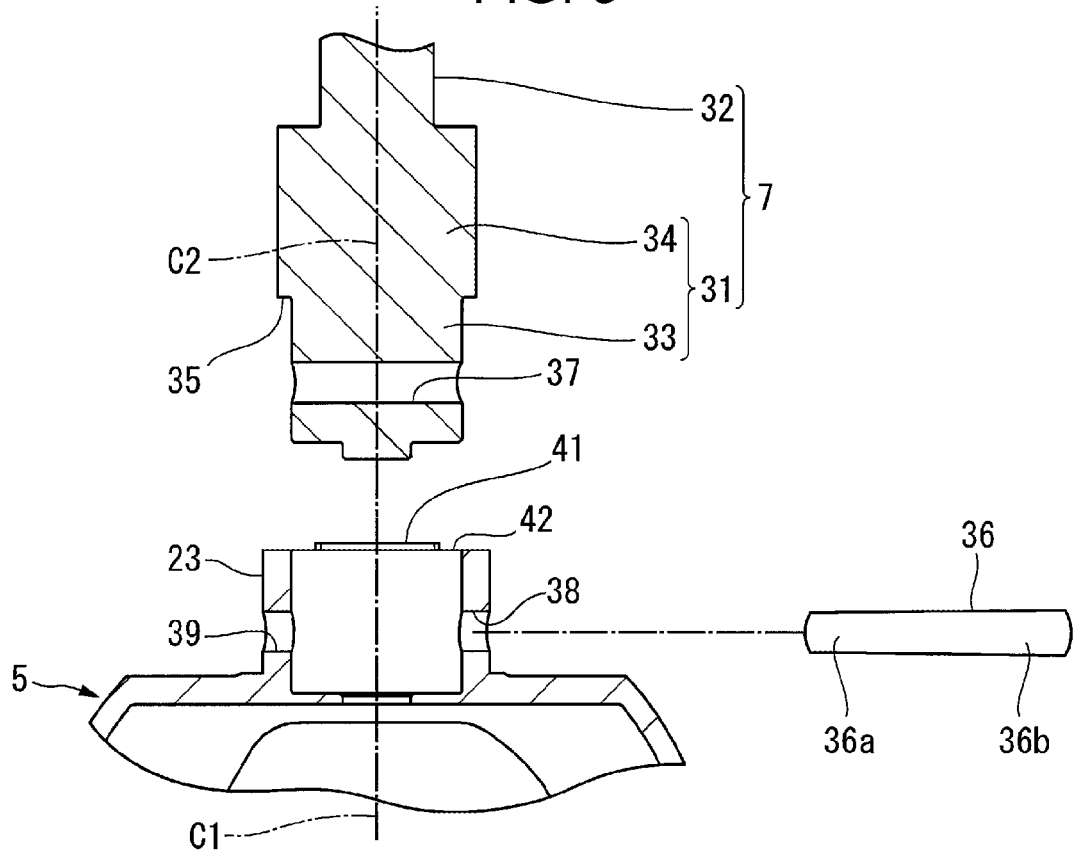
FIG. 3 is an exploded sectional view of the pin-fastening structure.

As illustrated in FIG. 2 and FIG. 3, the valve shaft 7 includes a first shaft portion 31 and a second shaft portion 32 that are arranged in the order from the side of the valve body 5.

The first shaft portion 31 constitutes a portion of the pin-fastening structure 6 (described later). The first shaft portion 31 has a columnar shape and includes a small-diameter portion 33 adjacent to the valve body 5 and a large-diameter portion 34 having an outer diameter larger than that of the small-diameter portion 33. As illustrated in FIG. 1, the first shaft portion 31 is inserted into the valve-shaft boss portion 25 of the valve box 4. As illustrated in FIG. 3, a first end surface 35 perpendicular to an axis C2 of the valve shaft 7 is disposed at a boundary portion between the small-diameter portion 33 and the large-diameter portion 34 of the first shaft portion 31. In FIG. 3, the axis C2 of the valve shaft 7 is illustrated so as to be positioned coaxially with the axis C1 of the valve body 5.

The second shaft portion 32 has a columnar shape and has an outer diameter smaller than that of the first shaft portion 31. One end portion of the second shaft portion 32 is connected to the large-diameter portion 34 of the first shaft portion 31 and the other end portion thereof is connected to the operation device 3. The valve shaft 7 rotates by being driven by the operation device 3. As a result of the rotation of the valve shaft 7, a rotational force is transmitted to the valve body 5 via the pin-fastening structure 6 (described later), and the valve body 5 rotates in conjunction with the valve shaft 7.

As illustrated in FIG. 3, the pin-fastening structure 6 is constituted by a shaft portion (first shaft portion 31) provided in the valve shaft 7, which is either one of members between the valve body 5 and the valve shaft 7, the cylindrical portion 23, which is the other one of members between the valve body 5 and the valve shaft 7 not provided with the shaft portion, provided in the valve body 5 and into which the shaft portion (first shaft portion 31) is fitted, and a connecting pin 36 that passes through both the shaft portion and the cylindrical portion 23 in a state in which the small-diameter portion 33 of the first shaft portion 31 is fitted into the cylindrical portion 23.

The first shaft portion 31 is positioned coaxially with the axis C2 of the valve shaft 7. In the present embodiment, the first shaft portion 31 corresponds to the "shaft portion" in the present disclosure. The axis C2 of the valve shaft 7 serves as a reference (as a rotation center) for the pivoting of the valve shaft 7.

The small-diameter portion 33 of the first shaft portion 31 is provided with a first pin hole 37 into which the connecting pin 36 is press-fitted.

The cylindrical portion 23 has a cylindrical shape and is positioned coaxially with the axis C1, which serves as a reference (as a rotation center) for the pivoting of the valve body 5. The cylindrical portion 23 according to the present embodiment is integral with the valve body 5.

The inner diameter of the cylindrical portion 23 is a diameter with which the small-diameter portion 33 is fitted into the cylindrical portion 23 in a state in which a minimum gap is present between the cylindrical portion 23 and the small-diameter portion 33 of the first shaft portion 31. The cylindrical portion 23 is provided with a second pin hole 38 and a third pin hole 39 into which the connecting pin 36 is press-fitted.

Figure 4:
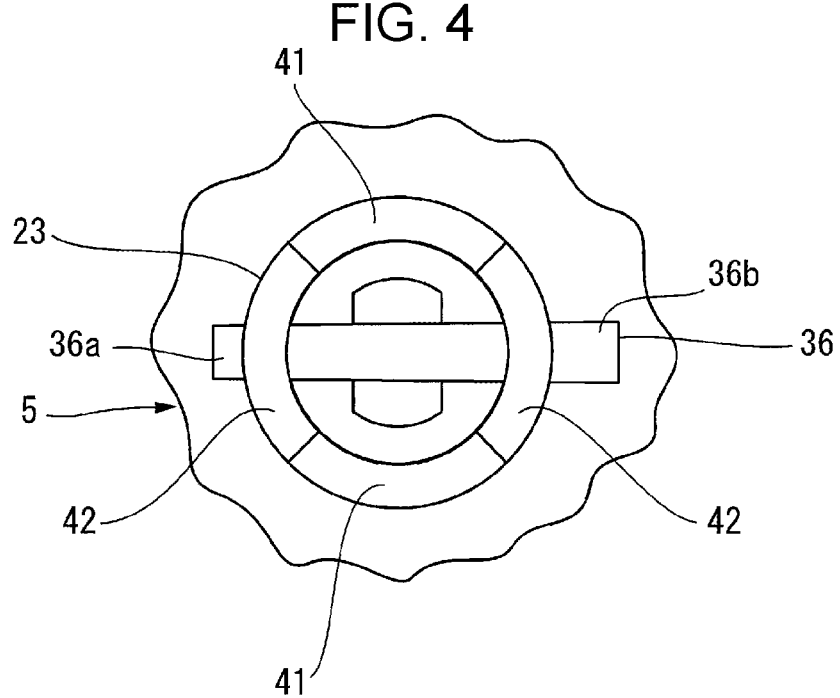
FIG. 4 is a plan view of a cylindrical portion viewed from the valve shaft.

As illustrated in FIG. 2 and FIG. 4, one end (distal end) of the cylindrical portion 23 in the axial direction thereof is constituted by a pair of second end surfaces 41 and a pair of recessed portions 42 formed between the second end surfaces 41. The pair of second end surfaces 41 are separated from each other at one side and the other side in the radial direction of the cylindrical portion 23 when viewed in the axial direction of the cylindrical portion 23. In the present embodiment, the distal end of the cylindrical portion 23 is divided in the circumferential direction into quarters, and each of the second end surfaces 41 and each of the recessed portions 42 are alternately arranged in the quarters corresponding thereto.

The second end surfaces 41 are positioned at most largely protruding portions of the cylindrical portion 23 and are perpendicular to an axis (axis C1 of the valve body 5) of the cylindrical portion 23. As illustrated in FIG. 4, the second end surfaces 41 according to the present embodiment are provided on both sides of the connecting pin 36 when the cylindrical portion 23 is viewed in the axial direction. The second end surfaces 41 come into contact with the first end surface 35 of the valve shaft 7 as a result of the first shaft portion 31 being press-fitted into the cylindrical portion 23.

As illustrated in FIG. 2, the recessed portions 42 have a shape similar to a shape of a partially depressed distal end of the cylindrical portion 23. As illustrated in FIG. 4, the recessed portions 42 are disposed in a predetermined area that includes a portion overlapping the connecting pin 36 when viewed in the axial direction of the cylindrical portion 23. The depth of the recessed portions 42 is set in accordance with a deformation amount of the cylindrical portion 23 that deforms when the connecting pin 36 is press-fitted into the second and third pin holes 38 and 39.

Figure 5:
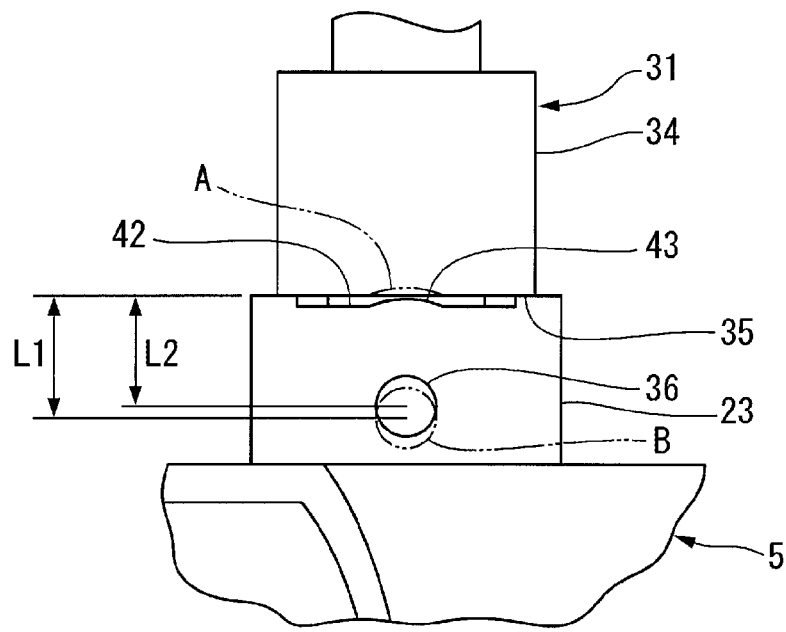
FIG. 5 is a side view of the pin-fastening structure.

When the connecting pin 36 is press-fitted into the second and third pin holes 38 and 39 of the cylindrical portion 23, the cylindrical portion 23 elastically deforms in a direction in which the hole diameter of each of the pin holes 38 and 39 increases. As illustrated in FIG. 5, such elastic deformation of the cylindrical portion 23 causes a distal end portion of the cylindrical portion 23 to partially swell to form a swollen portion 43. The recessed portions 42 are provided at positions corresponding to the connecting pin 36 to cause the swollen portion 43 to be formed inside the recessed portions 42. The depth of the recessed portions 42 is set to a depth with which the swollen portion 43 does not protrude from the second end surfaces 41.

The connecting pin 36 is a tapered pin that is press-fitted into the first pin hole 37 of the first shaft portion 31 and the second and third pin holes 38 and 39 of the cylindrical portion 23. The connecting pin 36 passes through the cylindrical portion 23 and the small-diameter portion 33 of the first shaft portion 31 in a direction intersecting both portions in a state in which the small-diameter portion 33 of the first shaft portion 31 is fitted into the cylindrical portion 23 as illustrated in FIG. 1 and the first end surface 35 is in contact with the second end surfaces 41 as illustrated in FIG. 5. As illustrated in FIG. 1, in a state in which the valve body 5 is positioned at the closing position to close the fluid passage 11, the connecting pin 36 according to the present embodiment is press-fitted into the first to third pin holes 37 to 39 such that a relatively thin one end portion 36a is positioned on the upstream side of the fluid passage 11 and a relatively thick other end portion 36b is positioned on the downstream side of the fluid passage 11. As a result of the connecting pin 36 being press-fitted into the first to third pin holes 37 to 39 as described above, the connecting pin 36 restricts relative movement of the cylindrical portion 23 and the first shaft portion 31 in the axial direction and in the rotational direction. In other words, the first end surface 35 and the second end surfaces 41 are held in contact with each other.

The connecting pin 36 is press-fitted in a state in which the first shaft portion 31 is fitted into the cylindrical portion 23 inside the valve box 4 and the first end surface 35 is in contact with the second end surfaces 41 as illustrated in FIG. 1. The direction in which the load of press fitting is applied to the connecting pin 36 is a direction from the downstream side toward the upstream side of the fluid passage 11 in a state in which the valve body 5 is positioned at the closing position to close the fluid passage 11. In other words, the first to third pin holes 37 to 39 extend in the longitudinal direction of the fluid passage 11 in the state in which the valve body 5 is positioned at the closing position at which the wall 21 closes the fluid passage 11, and the first to third pin holes 37 to 39 are formed so as to enable the connecting pin 36 to be press-fitted from the secondary side (downstream side of the fluid passage 11) of the rotary valve 2 toward the primary side (upstream side of the fluid passage 11) of the rotary valve 2. In the present embodiment, the second pin hole 38 of the cylindrical portion 23 is positioned on the downstream side of the fluid passage 11, and the third pin hole 39 is positioned on the upstream side of the fluid passage 11.

To press fit the connecting pin 36 into the first to third pin holes 37 to 39, a jig (not illustrated) for receiving the load of press fitting is first placed from the upstream side of the fluid passage 11 so as to overlap the cylindrical portion 23. Next, the connecting pin 36 is inserted into the valve box 4 through the fluid outlet 13 of the valve box 4, and the relatively thin one end portion 36a of the connecting pin 36 is fitted into the second pin hole 38 of the cylindrical portion 23. In this state, an impact load is applied to the relatively thick other end portion 36b of the connecting pin 36 from the secondary side of the rotary valve 2 toward the primary side to press fit the connecting pin 36 into the first to third pin holes 37 to 39 until the distal end of the connecting pin 36 protrudes from the third pin hole 39.

Figure 8:
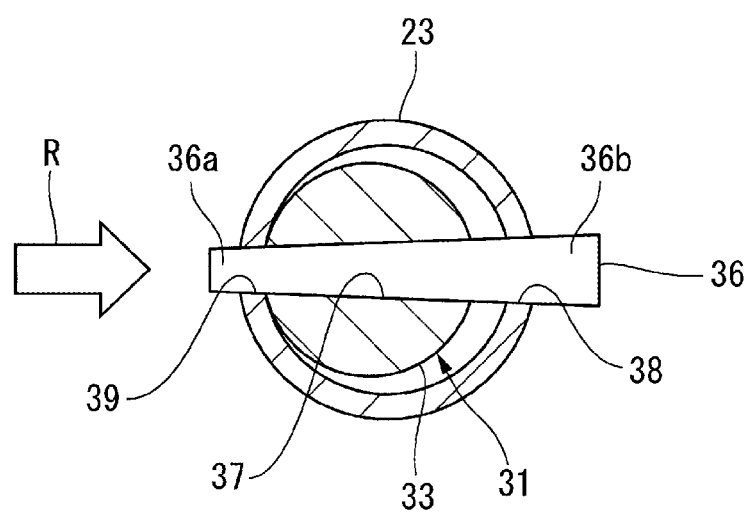
FIG. 8 is a sectional view of the cylindrical portion and a shaft portion into which a connecting pin is press-fitted.

When the connecting pin 36 is press-fitted into the first to third pin holes 37 to 39, the small-diameter portion 33 of the first shaft portion 31 moves toward the distal end of the connecting pin 36 inside the cylindrical portion 23, as illustrated in FIG. 8, by being pressed by the connecting pin 36. In FIG. 8, a gap between the cylindrical portion 23 and the small-diameter portion 33 is illustrated wider than its actual size for ease of understanding the state of each component during press fitting. In FIG. 8, the left side is the upstream side of the fluid passage 11 and the right side is the downstream side of the fluid passage 11.

Figure 6:
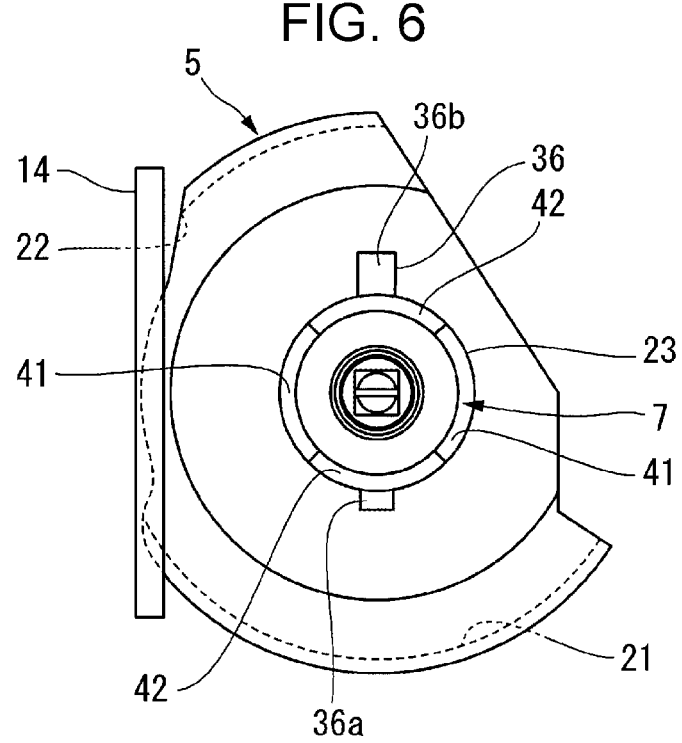
FIG. 6 is a plan view of the valve body and a seat ring at an opening position.
Figure 7:
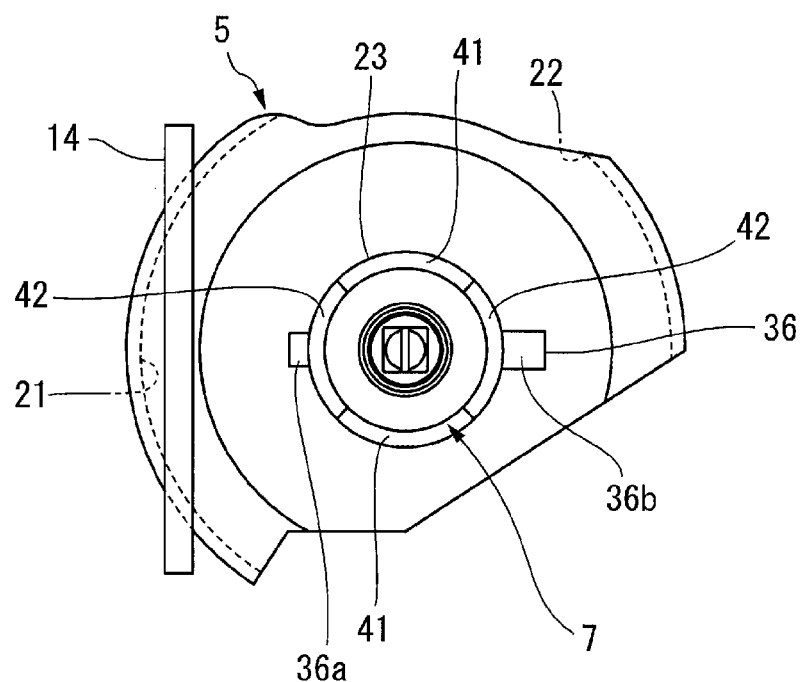
FIG. 7 is a plan view of the valve body and the seat ring at a closing position.

Comparing the state in which the valve body 5 is positioned at the opening position as illustrated in FIG. 6 with the state in which the valve body 5 is positioned at the closing position as illustrated in FIG. 7, the force that is applied to the valve body 5 by a fluid flowing inside the fluid passage 11 is larger in the state in which the valve body 5 is positioned at the closing position. Accordingly, as the state of the valve body 5 approaches a closing state, the force that the valve body 5 is subjected to increases due to a pressure difference between the primary side and the secondary side. In the present embodiment, the connecting pin 36 is press-fitted from the secondary side toward the primary side in the state in which the valve body 5 is positioned at the closing position. Therefore, the direction of force applied to the cylindrical portion 23 when fluid pressure is applied to the valve body 5 that is in the closing state is the direction in which the outer diameter of the connecting pin 36 constituted by a tapered pin increases in the longitudinal direction of the connecting pin 36, as indicated by arrow R in FIG. 8.

Figure 9:
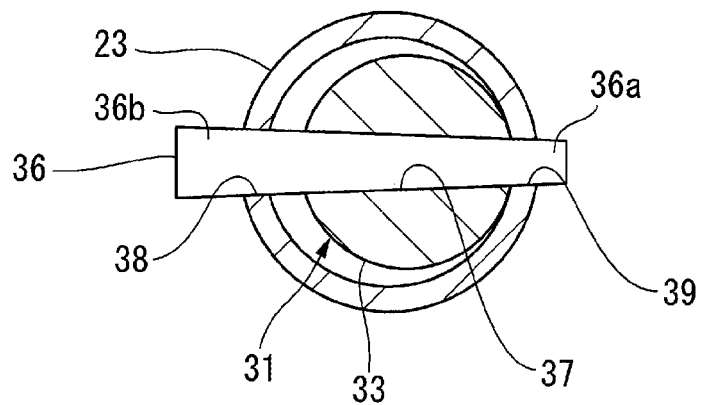
FIG. 9 is a sectional view of the cylindrical portion and the shaft portion into which the connecting pin is press-fitted from a primary side toward a secondary side.
Figure 10:
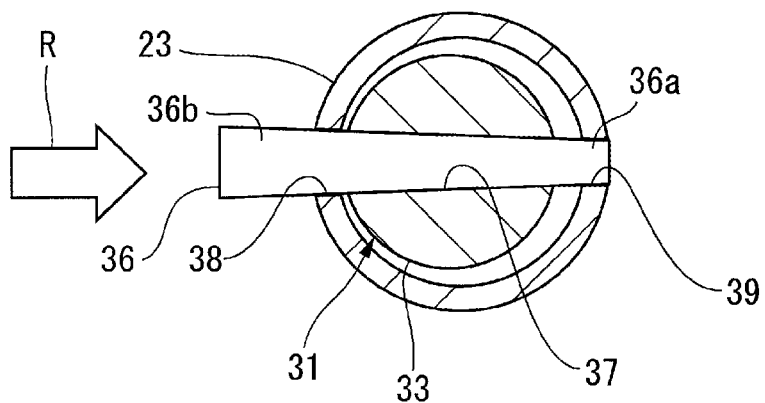
FIG. 10 is a sectional view of the cylindrical portion and the shaft portion, illustrating a state in which the cylindrical portion has moved.

When the connecting pin 36 is press-fitted in a state in which the load of press fitting is applied from the primary side toward the secondary side as illustrated in FIG. 9, the cylindrical portion 23 may move toward the secondary side as illustrated in FIG. 10 due to a force applied to the valve body 5 by a fluid.

In the rotary valve 2 that includes the thus configured pin-fastening structure 6, the valve shaft 7 is connected to the valve body 5 in a state in which the first end surface 35 of the valve shaft 7 and the second end surfaces 41 of the cylindrical portion 23 are in contact with each other. As a result of the first end surface 35 and the second end surfaces 41 being in contact with each other, the axis C2 of the first shaft portion 31 and the axis C1 of the cylindrical portion 23 are positioned coaxially with each other or parallel to each other.

Consequently, it is possible without depending on the length of the fitting portion between the valve shaft 7 and the valve body 5 to avoid inclining of the valve shaft 7 relative to the valve body 5.

Therefore, according to the present embodiment, it is possible to provide a pin-fastening structure for a valve shaft and a valve body, capable of fastening the valve shaft 7 and the valve body 5 with high coaxiality by using the connecting pin 36 while reducing the length of the fitting portion between the valve shaft 7 and the valve body 5.

The second end surfaces 41 according to the present embodiment are disposed, at one end of the cylindrical portion 23 in the axial direction, on both sides of the connecting pin 36 when the cylindrical portion 23 is viewed in the axial direction. The recessed portions 42 are disposed, at the one end of the cylindrical portion 23 in the axial direction, in a predetermined area that includes a portion overlapping the connecting pin 36 when the cylindrical portion 23 is viewed in the axial direction.

When the connecting pin 36 is press-fitted into the cylindrical portion 23, an end portion of the cylindrical portion 23 is pressed by the connecting pin 36, which causes an end surface of the cylindrical portion 23 to elastically deform and partially swell. The swelling of the end surface however occurs inside the recessed portions 42, and therefore, the swelling does not cause a portion of the end surface to protrude from the second end surfaces 41.

Accordingly, even when the distance between the connecting pin 36 and the one end of the cylindrical portion 23 in the axial direction is reduced, the second end surfaces 41 come into contact with the first end surface 35 with certainty, and no gap is formed between these surfaces. Consequently, it is possible to further reduce the length of the fitting portion between the valve shaft 7 and the valve body 5. Here, FIG. 5 will be referred to describe that it is possible to reduce the distance between the connecting pin 36 and the one end of the cylindrical portion 23 in the axial direction.

If the cylindrical portion 23 is not provided with the recessed portions 42, a swollen portion is generated, as indicated by long dashed double-dotted line A in FIG. 5, at the one end of the cylindrical portion 23 when the connecting pin 36 is positioned at the position illustrated in FIG. 5. Therefore, in this case, the position of the connecting pin 36 needs to be changed to the position indicated by long dashed double-dotted line B in FIG. 5 to reduce the amount of protruding of the swollen portion. The distance between the connecting pin 36 and the one end of the cylindrical portion 23 in this case is L1.

In contrast, the swollen portion 43 is generated inside the recessed portions 42 in the present embodiment, and it is thus possible to dispose the connecting pin 36 closer to the one end of the cylindrical portion 23 by a distance corresponding to the depth of the recessed portions 42. According to the present embodiment, L2, which is the distance between the connecting pin 36 and the cylindrical portion 23, is shorter than the aforementioned distance L1.

The connecting pin 36 according to the present embodiment is a tapered pin that is press-fitted into the small-diameter portion 33 of the first shaft portion 31 and the cylindrical portion 23. The direction in which the load of press fitting is applied to the connecting pin 36 is the direction from the downstream side toward the upstream side of the fluid passage 11 in a state in which the valve body 5 is positioned at the closing position to close the fluid passage 11.

Therefore, the direction of a force applied to the shaft portion or the cylindrical portion 23 when fluid pressure is applied to the valve body 5 that is in the closing state is the direction in which the outer diameter of the connecting pin 36 increases in the longitudinal direction of the connecting pin 36.

Accordingly, it is possible to hold a state in which the coaxiality between the first end surface 35 and the second end surfaces 41 in contact with each other is high with certainty because the force applied to the valve body 5 by the fluid does not move the cylindrical portion 23 (does not loosen the connecting pin 36 constituted by a tapered pin).

The cylindrical portion 23 according to the present embodiment is provided in the valve body 5, and the shaft portion (first shaft portion 31) is provided in the valve shaft 7. Consequently, it is possible to form the valve-shaft boss portion 25, which is provided in the valve box 4 to pass the valve shaft 7 therethrough, so as to be relatively thin compared with a case in which the cylindrical portion 23 is provided in the valve shaft 7, and it is thus possible to reduce the size of the valve box 4.

Second Embodiment

Figure 11:
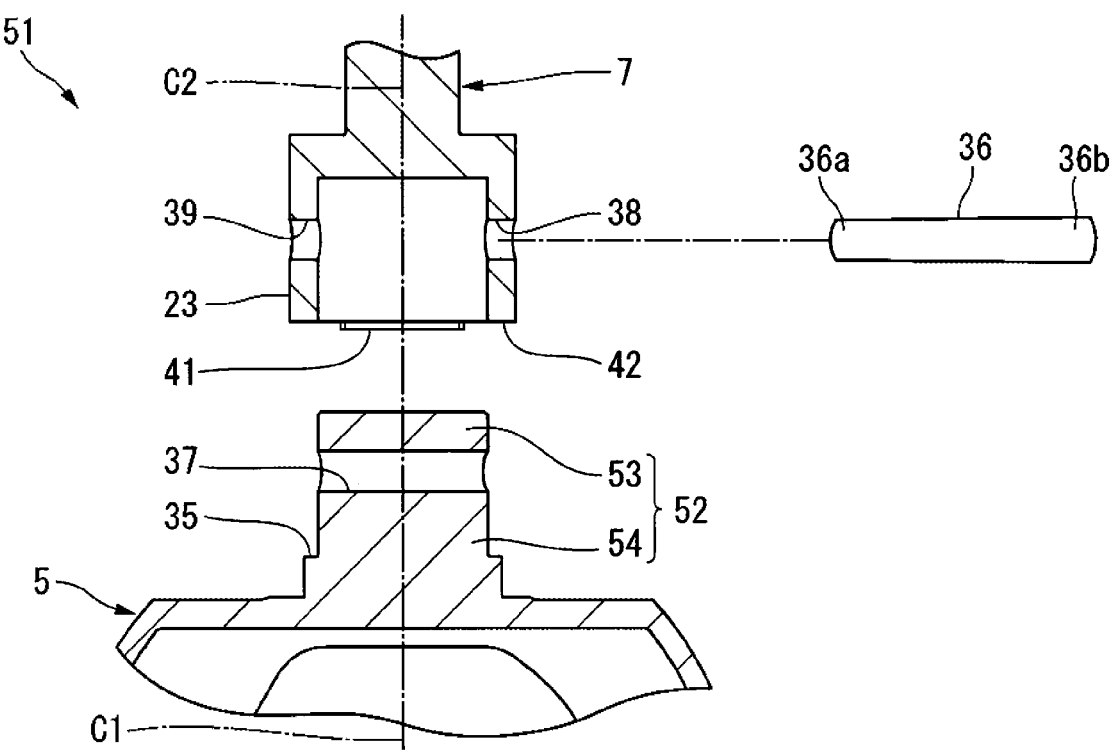
FIG. 11 is a sectional view of the pin-fastening structure according to another embodiment.

In the aforementioned embodiment, an example in which the cylindrical portion is provided in the valve body and the shaft portion is provided in the valve shaft is presented. However, the present disclosure can be carried out even when the positions of the cylindrical portion 23 and the shaft portion are inverted as illustrated in FIG. 11. In FIG. 11, members identical or equivalent to those described with reference to FIGS. 1 to 10 are given identical reference signs, and detailed description thereof will be omitted, as appropriate.

A pin-fastening structure 51 illustrated in FIG. 11 includes the cylindrical portion 23 provided in the valve shaft 7, a shaft portion 52 provided in the valve body 5, and the connecting pin 36 that passes through the cylindrical portion 23 and the shaft portion 52. The second end surfaces 41 and the recessed portions 42 are provided at the distal end of the cylindrical portion 23. The cylindrical portion 23 is provided with second and third pin holes 38 and 39 into which the connecting pin 36 is press-fitted.

The shaft portion 52 includes a small-diameter portion 53 that is fitted into the cylindrical portion 23 and a large-diameter portion 54 having an outer diameter larger than that of the small-diameter portion 53. The small-diameter portion 53 is provided with the first pin hole 37. A boundary portion between the small-diameter portion 53 and the large-diameter portion 54 has the first end surface 35.

The connecting pin 36 is a tapered pin and is press-fitted from the secondary side toward the primary side in the state in which valve body 5 is positioned at the closing position. In other words, the connecting pin 36 is press-fitted into the first to third pin holes 37 to 39 such that the relatively thin one end portion 36a is positioned on the upstream side of the fluid passage and the relatively thick other end portion 36b is positioned on the downstream side of the fluid passage.

In the thus configured pin-fastening structure 51, it is also possible without depending on the length of the fitting portion between the valve shaft 7 and the valve body 5 to avoid inclining of the valve shaft 7 relative to the valve body 5. Consequently, it is possible to provide a pin-fastening structure for a valve shaft and a valve body, capable of fastening the valve shaft 7 and the valve body 5 with high coaxiality by using the connecting pin 36.

Even when this configuration is employed, a swollen portion (not illustrated) that is generated when an end portion of the cylindrical portion 23 is pressed by the connecting pin 36 is positioned inside the recessed portions 42, and thus, the first end surface 35 and the second end surfaces 41 come into contact with each other with certainty.

Moreover, even when this configuration is employed, it is possible to hold the state in which coaxiality between the first end surface 35 and the second end surfaces 41 in contact with each other is high with certainty because the force applied to the valve body 5 by a fluid does not loosen the connecting pin 36 constituted by a tapered pin.

In each of the aforementioned embodiments, an example in which a tapered pin is used as the connecting pin 36 is presented. However, a pin other than a tapered pin, such as a parallel pin or a spring pin, may be used as the connecting pin 36, or a plurality of pins of an identical type or pins of a plurality of types may be combined together to be used as the connecting pin 36.

In the aforementioned embodiment, an example in which the present disclosure is applied to the rotary valve 2 is presented. The present disclosure is however applicable to a valve other than a rotary valve, such as a butterfly valve, a globe valve, a gate valve, or ball valve. When the present disclosure is applied to a gate valve, a valve body and a valve shaft "reciprocate".

What is claimed is:

1. A pin-fastening structure for a valve shaft and a valve body, the pin-fastening structure comprising:
    a shaft portion provided on the valve shaft, which pivots or reciprocates in conjunction with the valve body, the shaft portion being positioned coaxially with an axis that serves as a reference for the pivoting or the reciprocating;
    a cylindrical portion into which the shaft portion is fitted, the cylindrical portion having a bottom surface connected to the valve body; and
    a connecting pin that passes through both the shaft portion and the cylindrical portion in a state in which the shaft portion is fitted into the cylindrical portion and that restricts relative movement of the shaft portion and the cylindrical portion in an axial direction,
    wherein the shaft portion has a first end surface perpendicular to the axis,
    wherein the cylindrical portion has a distal end surface perpendicular to an axis of the cylindrical portion and on an opposite end from the bottom surface of the cylindrical portion in the axial direction, such that the connecting pin is between the distal end surface and the bottom surface of the cylindrical portion in the axial direction, wherein the distal end surface of the cylindrical portion includes a second end surface and a recessed surface circumferentially adjacent to the second end surface and recessed toward the bottom surface, the recessed surface being disposed in a portion of the distal end surface overlapping the connecting pin when the cylindrical portion is viewed in the axial direction, and wherein the shaft portion and the cylindrical portion are fastened by the connecting pin in a state in which the first end surface and the second end surface are in contact with each other.

2. The pin-fastening structure for the valve and the valve body according to claim 1, wherein the distal end surface of the cylindrical portion includes another second end surface and another recessed surface, and the distal end surface of the cylindrical portion is divided in the circumferential direction into quarters, and each of the second end surfaces and the recessed surfaces are alternately arranged in the quarters.

3. The pin-fastening structure for the valve shaft and the valve body according to claim 1, wherein the connecting pin is a tapered pin that is press-fitted into the shaft portion and the cylindrical portion, and wherein, in a state in which the valve body is positioned at a closing position to close a fluid passage, a first end portion of the connecting pin is positioned on an upstream side of the fluid passage and a second end portion of the connecting pin is positioned on a downstream side of the fluid passage, the first end portion being thinner than the second end portion.

4. The pin-fastening stricture of claim 1, wherein the shaft portion includes a first columnar portion having a first diameter adjacent to a second columnar portion having a second diameter, the first diameter being smaller than the second diameter.

5. The pin-fastening structure of claim 4, wherein the first end surface is provided on an end of the second columnar portion that overhangs the first columnar portion.

6. A pin-fastening structure for a valve shaft and a valve body, the pin-fastening structure comprising:

a shaft portion provided on a valve body that pivots or reciprocates inside a valve box, the shaft portion having a bottom surface connected to the valve body, and the shaft portion being positioned coaxially with an axis that serves as a reference for the pivoting or the reciprocating;

a cylindrical portion into which the shaft portion is fitted, the cylindrical portion being provided on the valve shaft; and a connecting pin that passes through both the shaft portion and the cylindrical portion in a state in which the shaft portion is fitted into the cylindrical portion and that restricts relative movement of the shaft portion and the cylindrical portion in an axial direction, wherein the shaft portion has a first end surface perpendicular to the axis, wherein the cylindrical portion has a distal end surface perpendicular to an axis of the cylindrical portion, the first end surface of the shaft portion being away from the bottom surface of the shaft portion in the axial direction such that the first end surface is between the connecting pin and the bottom surface of the shaft portion in the axial direction, wherein the distal end surface of the cylindrical portion includes a second end surface and a recessed surface circumferentially adjacent to the second end surface and recessed away from the bottom surface, the recessed surface being disposed in a portion of the distal end surface overlapping the connecting pin when the cylindrical portion is viewed in the axial direction, and wherein the shaft portion and the cylindrical portion are fastened by the connecting pin in a state in which the first end surface and the second end surface are in contact with each other.

* * * * *